US009652157B2

(12) United States Patent
Fisher et al.

(10) Patent No.: US 9,652,157 B2
(45) Date of Patent: May 16, 2017

(54) ACCELERATED NON-VOLATILE MEMORY RECIRCULATION PROCESSING

(71) Applicant: International Business Machines Corporation, Armonk, NY (US)

(72) Inventors: Timothy J. Fisher, Cypress, TX (US); Lincoln T. Simmons, Houston, TX (US); Adalberto G. Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 14/663,349

(22) Filed: Mar. 19, 2015

(65) Prior Publication Data
US 2016/0274801 A1 Sep. 22, 2016

(51) Int. Cl.
*G06F 12/00* (2006.01)
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ..... G06F 3/0679; G06F 3/0611; G06F 3/0659
USPC .......................................................... 711/103
See application file for complete search history.

(56) References Cited

U.S. PATENT DOCUMENTS

| 6,480,954 | B2 | 11/2002 | Trimberger et al. |
| 8,478,723 | B2 * | 7/2013 | Rousseau ............ G06F 12/0246 707/633 |
| 8,527,693 | B2 | 9/2013 | Flynn et al. |
| 8,688,951 | B2 | 4/2014 | Yamada et al. |
| 2011/0238886 | A1 * | 9/2011 | Post .................... G06F 12/0246 711/103 |
| 2013/0166831 | A1 | 6/2013 | Atkisson et al. |
| 2013/0173882 | A1 * | 7/2013 | Bhowmik ........... G06F 12/1036 711/207 |
| 2013/0246693 | A1 * | 9/2013 | Lee .................... G06F 12/0246 711/103 |

(Continued)

FOREIGN PATENT DOCUMENTS

| EP | 1197847 A2 | 4/2002 |
| EP | 2264602 A1 | 12/2010 |

OTHER PUBLICATIONS

Farabet et al., "Hardware Accelerated Convolutional Neural Networks for Synthetic Vision Systems," International Symposium on Circuits and Systems (ISCAS), Proceedings of 2010 IEEE, May/Jun. 2010, pp. 257-260.

(Continued)

*Primary Examiner* — Pierre-Michel Bataille
(74) *Attorney, Agent, or Firm* — Zilka-Kotab, PC

(57) ABSTRACT

A method, according to one embodiment, includes: receiving a recirculation command, performing a coarse page lookup to determine valid ones of logical pages to be recirculated, issuing write commands for the valid logical pages, requesting performance of a fine page lookup on source physical addresses containing the valid logical pages to verify the valid logical pages, receiving verified valid logical pages resulting from the fine page lookup, and sending the write commands corresponding to the verified valid logical pages. Other systems, methods, and computer program products are described in additional embodiments.

20 Claims, 10 Drawing Sheets

(56) References Cited

U.S. PATENT DOCUMENTS

2013/0332684 A1    12/2013  Kandiraju et al.
2013/0339572 A1*   12/2013  Fanning ................ G06F 3/0688
                                                            711/102

OTHER PUBLICATIONS

Zemcik, P. "Hardware Acceleration of Graphics and Imaging Algorithms Using FPGAs," SCCG '02 Proceedings of the 18th Spring Conference on Computer Graphics, Apr. 2002, 7 pages.

* cited by examiner

710

4.

| Page | CW1 (EMS) | | | CW0 (EMS) | | |
|---|---|---|---|---|---|---|
| M+2 | 0 | 1 | 1 | 1 | 0 | 1 |

3.

| Page | CW1 (EMS) | | | CW0 (EMS) | | |
|---|---|---|---|---|---|---|
| N+2 | 0 | 1 | 1 | 1 | 1 | 0 |

2.

| Page | CW1 (EMS) | | | CW0 (EMS) | | |
|---|---|---|---|---|---|---|
| M+1 | 1 | 1 | 0 | 0 | 1 | 0 |

1.

| Page | CW1 (EMS) | | | CW0 (EMS) | | |
|---|---|---|---|---|---|---|
| N | 0 | 1 | 0 | 0 | 0 | 0 |

| | LBA | Source Address |
|---|---|---|
| 1. | C | Page N, CW 1 |
| 2. | P | Page M+1, CW 0 |
| 3. | Q | Page M+1, CW 1 |
| 4. | H | Page N+2, CW 0 |
| 5. | I | Page N+2, CW 0 |
| 6. | J | Page N+2, CW 1 |
| 7. | R | Page M+1, CW 1 |
| 8. | T | Page M+2, CW 0 |
| 9. | U | Page M+2, CW 1 |
| | ⋮ | ⋮ |

ACCELERATED NON-VOLATILE MEMORY RECIRCULATION PROCESSING

BACKGROUND

The present invention relates to data storage systems, and more particularly, this invention relates to accelerated non-volatile memory recirculation for codewords having more than one logical page.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

BRIEF SUMMARY

A method, according to one embodiment, includes: receiving a recirculation command, performing a coarse page lookup to determine valid ones of logical pages to be recirculated, issuing write commands for the valid logical pages, requesting performance of a fine page lookup on source physical addresses containing the valid logical pages to verify the valid logical pages, receiving verified valid logical pages resulting from the fine page lookup, and sending the write commands corresponding to the verified valid logical pages.

A computer program product, according to another embodiment, includes a computer readable storage medium having program instructions embodied therewith, the program instructions readable and/or executable by a controller to cause the controller to: receive, by the controller, a recirculation command, perform, by the controller, a coarse page lookup to determine valid ones of logical pages to be recirculated, issue, by the controller, write commands for the valid logical pages, request, by the controller, performance of a fine page lookup on physical pages of each block containing the valid logical pages to verify the write commands, receive, by the controller, verified write commands resulting from the fine page lookup, and send, by the controller, the verified write commands.

A system, according to another embodiment, includes: a plurality of non-volatile random access memory blocks configured to store data, and a processor and logic integrated with and/or executable by the processor, the logic being configured to: receive a recirculation command, perform a coarse page lookup to determine valid ones of logical pages to be recirculated, issue write commands for the valid logical pages, request performance of a fine page lookup on physical pages of each block containing the valid logical pages to verify the write commands, receive verified write commands resulting from the fine page lookup, and send the verified write commands.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 7B is a representational diagram of a list of recirculation commands, in accordance with one embodiment.

FIG. 7C is a representational diagram of a list of recirculation write commands, in accordance with one embodiment.

DETAILED DESCRIPTION

Figure 1:
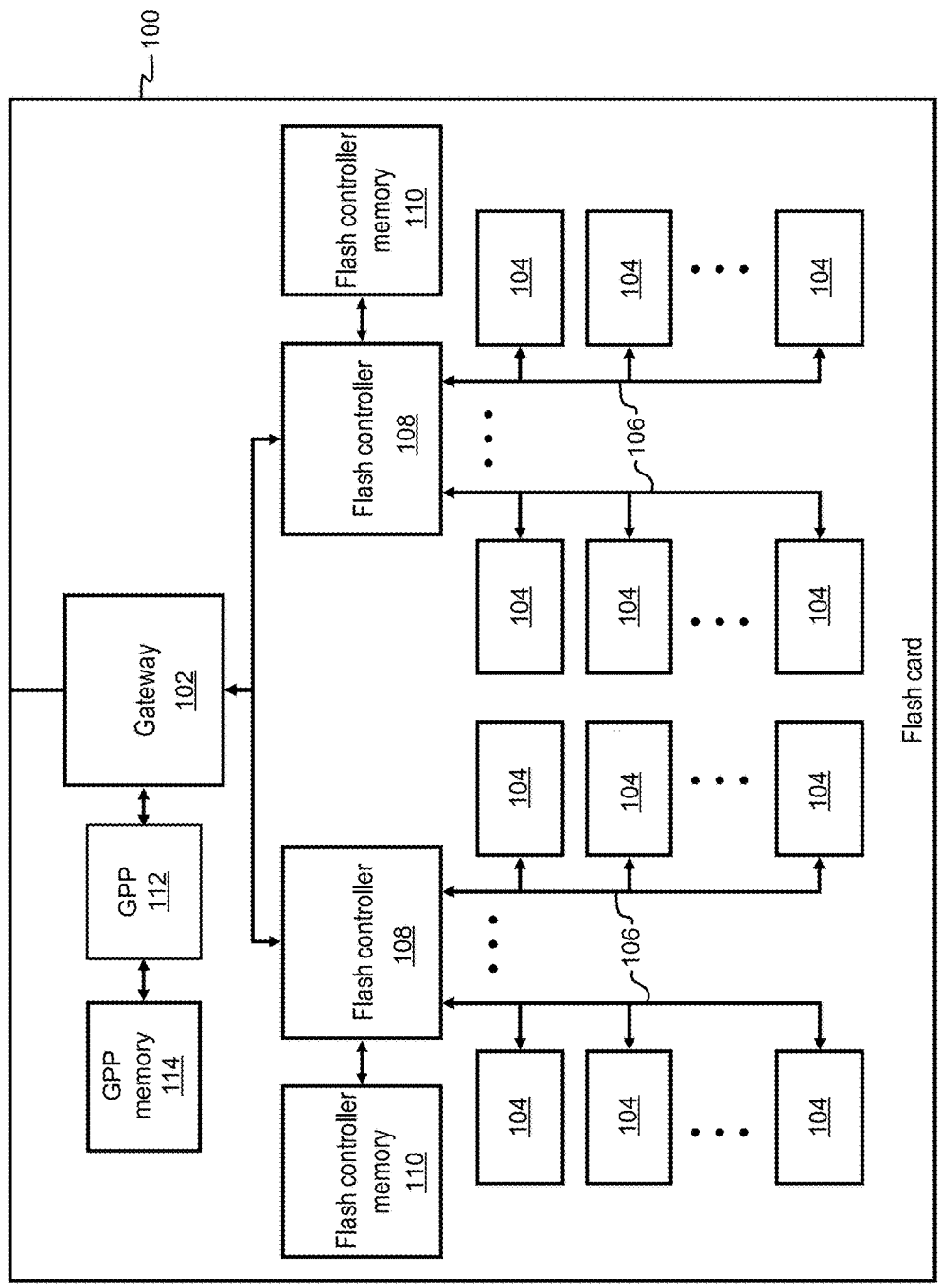
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a method includes: receiving a recirculation command, performing a coarse page lookup to determine valid ones of logical pages to be recirculated, issuing write commands for the valid logical pages, requesting performance of a fine page lookup on source physical addresses containing the valid logical pages to verify the valid logical pages, receiving verified valid logical pages resulting from the fine page lookup, and sending the write commands corresponding to the verified valid logical pages.

In another general embodiment, a computer program product includes a computer readable storage medium having program instructions embodied therewith, the program instructions readable and/or executable by a controller to cause the controller to: receive, by the controller, a recirculation command, perform, by the controller, a coarse page lookup to determine valid ones of logical pages to be recirculated, issue, by the controller, write commands for the valid logical pages, request, by the controller, performance of a fine page lookup on physical pages of each block containing the valid logical pages to verify the write commands, receive, by the controller, verified write commands resulting from the fine page lookup, and send, by the controller, the verified write commands.

In yet another general embodiment, a system includes: a plurality of non-volatile random access memory blocks configured to store data, and a processor and logic integrated with and/or executable by the processor, the logic being configured to: receive a recirculation command, perform a coarse page lookup to determine valid ones of logical pages to be recirculated, issue write commands for the valid logical pages, request performance of a fine page lookup on physical pages of each block containing the valid logical pages to verify the write commands, receive verified write commands resulting from the fine page lookup, and send the verified write commands.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
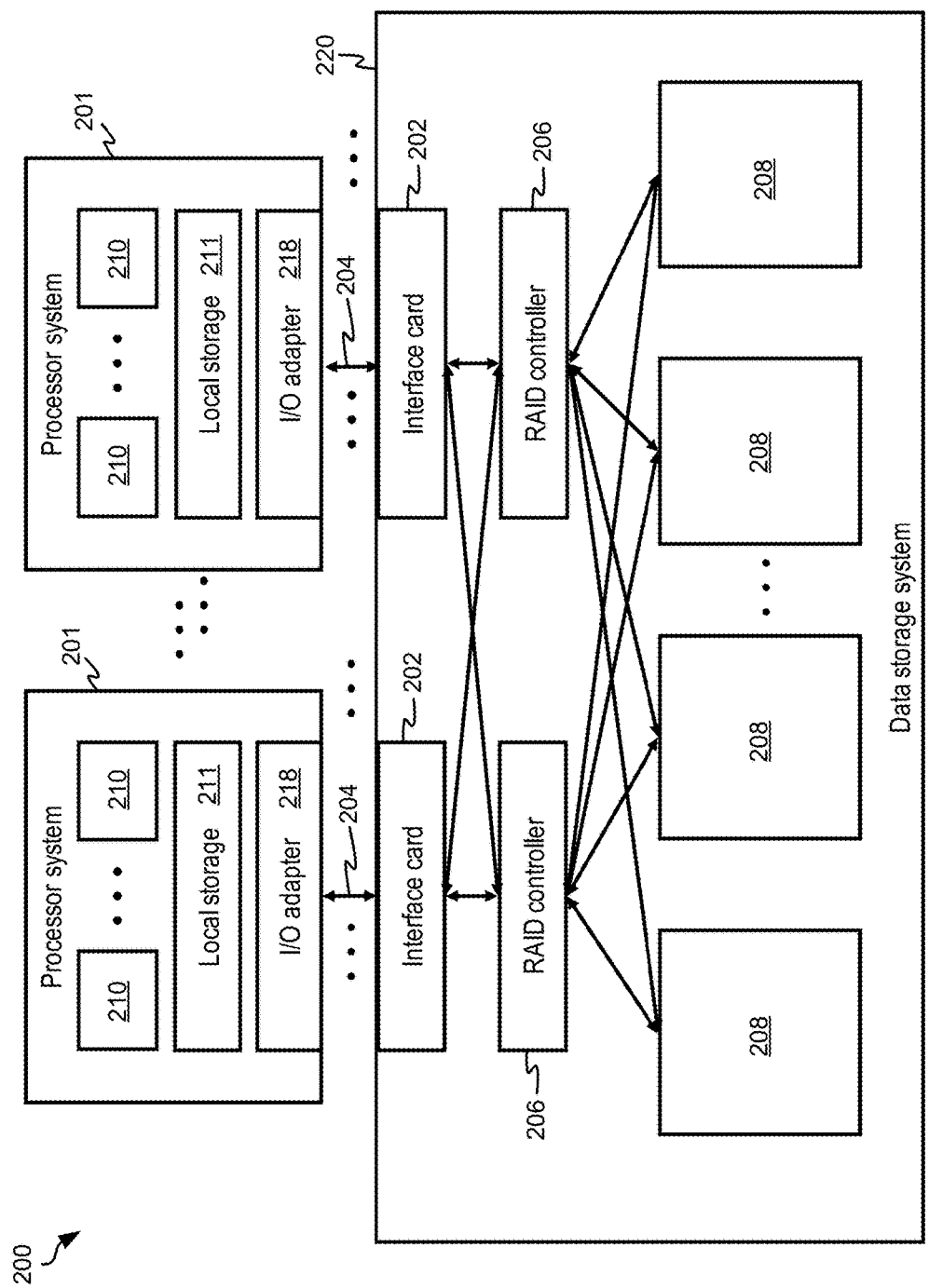
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, block-stripes may be identified for being reclaimed and/or relocated.

The unit of the garbage collection operation is also referred to herein as the Logical Erase Block (LEB). It should also be noted that an LEB may include any multiple of the physical memory block, which is a unit of physical erasure. Moreover, the organization of memory blocks into LEBs allows for adding RAID-like parity protection schemes among memory blocks from different memory chips, memory planes and/or channels as well as significantly enhancing performance through higher parallelism.

According to an exemplary embodiment, which is in no way intended to limit the invention, memory controllers (e.g., see 108 of FIG. 1) may internally perform a garbage collection. As previously mentioned, the garbage collection may include selecting a block-stripe to be relocated, after which all data that is still valid on the selected block stripe may be relocated (e.g., moved). After the still valid data has been relocated, the entire block-stripe may be erased and thereafter, used for storing new data. The amount of data relocated from the garbage collected block-stripe determines the write amplification. Moreover, an efficient way to reduce the write amplification includes implementing heat segregation.

Heat Segregation

In the present context, the "heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

It should be noted that the number of read requests to and/or read operations performed on a memory block may not come into play when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore the write amplification incurred by performing garbage collection is much lower for embodiments implementing heat segregation.

Secondly, the relative heat of data can be utilized for wear leveling purposes. For example, hot data may be placed in younger (e.g., healthier) memory blocks, while cold data may be placed on older (e.g., less healthy) memory blocks relative to those younger memory blocks. Thus, the rate at which relatively older blocks are exposed to wear is effectively slowed, thereby improving the lifetime of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
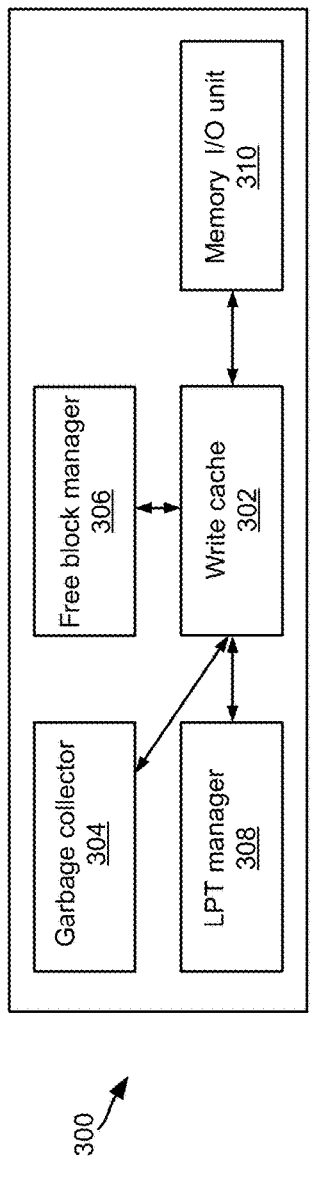
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
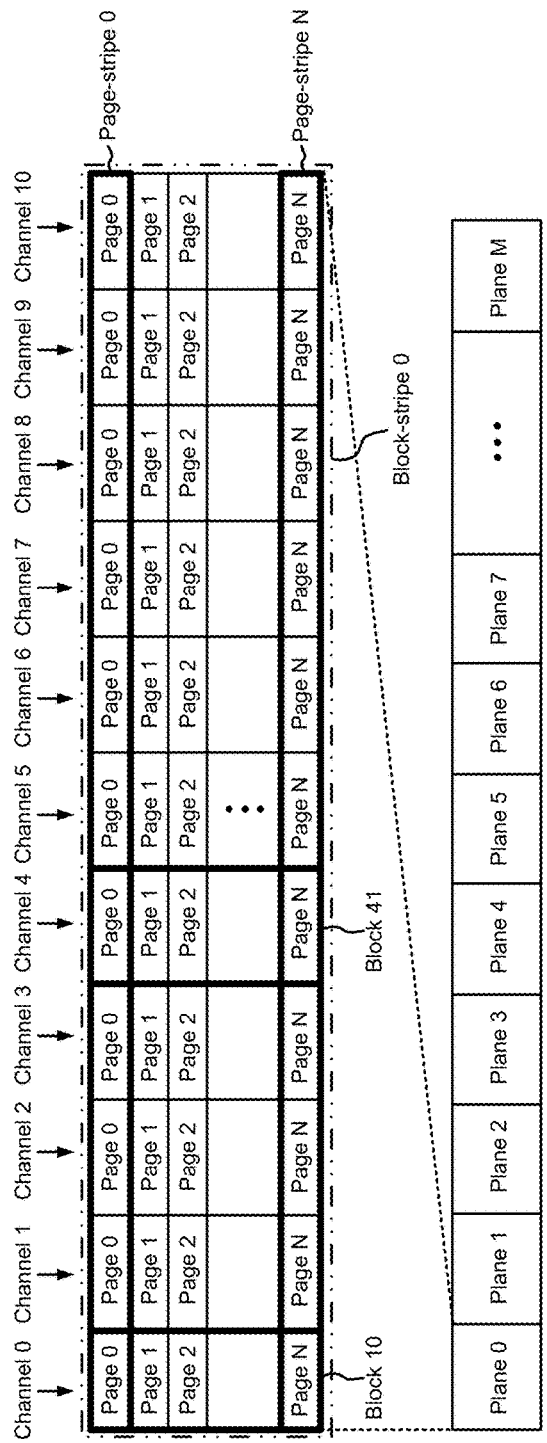
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 planes labeled "Plane 0" through "Plane M". When implemented with data stored in non-volatile memory, each plane on a channel may include a large set of blocks, e.g., typically in the order of 1024, 2048 or more. Moreover, one or more plane may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and channel.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of Plane 0 may constitute a unique block when implemented in a cache architecture. Similarly, each channel may correspond to a single, individual block. For example, looking to conceptual diagram 400, Block 10 includes all pages (Page 0 through Page N) in Channel 0 while Block 41 corresponds to all pages in Channel 4, and so on.

In the context of a memory controller, e.g., which may be capable of implementing RAID at the channel level, a block-stripe is made up of multiple blocks which amount to a stripe of blocks. Looking still to FIG. 4, the multiple blocks of Plane 0 constitute Block-stripe 0. While all blocks in a block-stripe typically belong to the same plane, in some embodiments one or more blocks of a block-stripe may belong to different planes. It follows that each plane may include a block-stripe. Thus, according to an illustrative embodiment, Block 0 through Block 10 may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As mentioned above, the LSA architecture of non-volatile (e.g., Flash-based) memory cells relies on out-of-place writes. In this approach, a logical page overwrite operation will result in recirculating the data of the logical page being overwritten, by writing the data to a new physical location in memory, marking the logical page at the physical location having the old copy of the data as invalid, and then updating the mapping information. However, the invalidated data locations cannot be reused until the entire block they belong to has been erased.

Before erasing a block of non-volatile memory, the block undergoes garbage collection, whereby all logical pages that are still valid (not yet invalidated) within the block are identified and relocated to a new block. However, the conventional process used to identify which logical pages are still valid within a block requires a great deal of processing power as every physical location within the block must be individually examined in order to determine whether a logical page written thereto it is still valid.

In sharp contrast to the aforementioned conventional shortcomings, various embodiments described herein achieve accelerated non-volatile memory recirculation while performing garbage collection operations. In some approaches, the accelerated non-volatile memory recirculation results from a relationship between software and hardware which improves the ability to recirculate (e.g., move) logical pages in non-volatile memory, as will be described below. As a result, some of the embodiments described herein allow for improved flexibility and efficient processing of recirculating logical pages.

Figure 5:
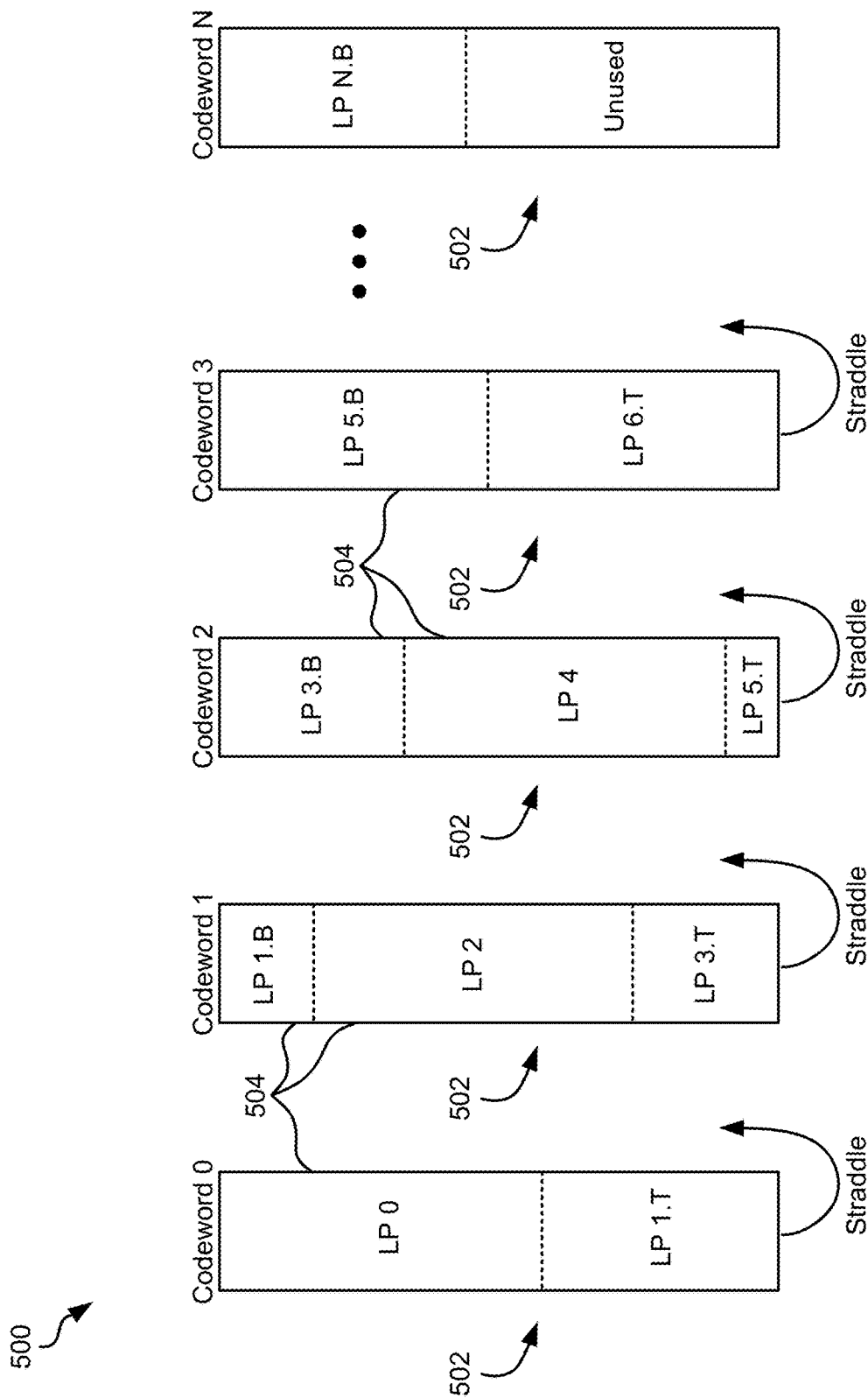
FIG. 5 is a representational diagram of a block of memory, in accordance with one embodiment.

Looking to FIG. 5, a block 500 of non-volatile memory is shown according to one embodiment. As an option, the present block 500 may be implemented in conjunction with features from any other embodiment listed herein, such as those described with reference to the other FIGS., such as FIG. 4. However, such block 500 and others presented herein may be used in various applications and/or in permutations which may or may not be specifically described in the illustrative embodiments listed herein. Further, the block 500 presented herein may be used in any desired environment. Thus FIG. 5 (and the other FIGS.) may be deemed to include any possible permutation.

As illustrated, the block 500 includes codeword payload data containers 502 labeled Codeword 0 through Codeword N. Moreover, logical pages 504, labeled LP 0 through LP N, are packed into the codeword payload data containers 502. The codeword payload data containers 502 store a non-integer number of logical pages, resulting in "straddling" across the boundaries between payload data containers. According to the present description, "straddling" denotes when the entirety of a logical page 504 does not fit in a given codeword payload data containers 502 and a remainder of the logical page 504 straddles onto the next codeword payload data containers 502. For example, a portion of a logical page LP 1.T fits at the end of Codeword 0 and a remainder of the logical page LP 1.B straddles onto the beginning of Codeword 1.

Although straddling may occur between codeword payload data containers 502 of the block 500, straddling is preferably disabled between codeword payload data containers of different blocks. Thus, straddling between two different blocks is preferably avoided. Accordingly, the final codeword Codeword N of block 500 has unused space which may have been unable to accommodate a logical page therein without the logical page straddling out of the block 500. There may also be additional boundaries within the block 500 at which straddling does not take place, e.g., depending upon the way in which data aligns with the codewords 502.

Once logical pages 504 have been packed into the codeword payload data containers 502, the codeword payload data containers 502 may be concatenated with a codeword payload header to produce a codeword payload. Moreover, each codeword payload may then be "encoded" to yield a codeword which allows for the correction of errors within the codeword. The encoding process is preferably systematic, so the codeword payload remains unchanged by the encoding process.

Finally, a number of codewords are packed together into physical pages of non-volatile memory. In one example, a pair of codewords may be packed together into physical pages of non-volatile memory. However, according to alternate examples, three, four, five, or more codewords may be packed together into physical pages of non-volatile memory, depending on the desired approach.

Moreover, each codeword may additionally include physical header information which is stored in the flash memory. The header information may include an initial offset to the first logical page (e.g., first fully contained logical page) within the codeword and/or the physical address of the flash page used to perform a validation check of the address used in the actual command, e.g., to provide an additional level of protection, as will be appreciated by one skilled in the art upon reading the present description.

Logical pages packed into each of the codewords of the physical pages of non-volatile memory may be accessed as a result of a read request, a memory lookup, user request, etc. However, the logical pages packed into each of the codewords of the physical pages may also be updated (e.g., overwritten) depending on the approach. Moreover, as mentioned above, a logical page overwrite will result in recirculating the logical page data by writing it to a new location in memory, marking the old copy of the logical page data as invalid, and then updating the mapping information. Thus, over time, various logical pages stored within a series of physical pages of memory may have been invalidated (also referred to herein as being qualified as "dirty") as a result of having been updated, deleted, etc.

Although recirculating data of a specific logical page during an update operation may be straightforward in the sense that the physical location of the logical page to be updated is known, dirty and valid logical pages are interleaved within the codewords and across physical pages of memory thereby hindering the performance of garbage collection operations on a given block of memory. For example, as mentioned above, conventional process must individually examine every logical page written to a physical block in order to identify which logical pages are still valid, and distinguish them from the dirty logical pages. This requires a great deal of processing power and time to perform. Accordingly, an improved method of determining which logical pages within a block of memory to be garbage collected are valid, and which logical pages are dirty, is desired.

Figure 6:
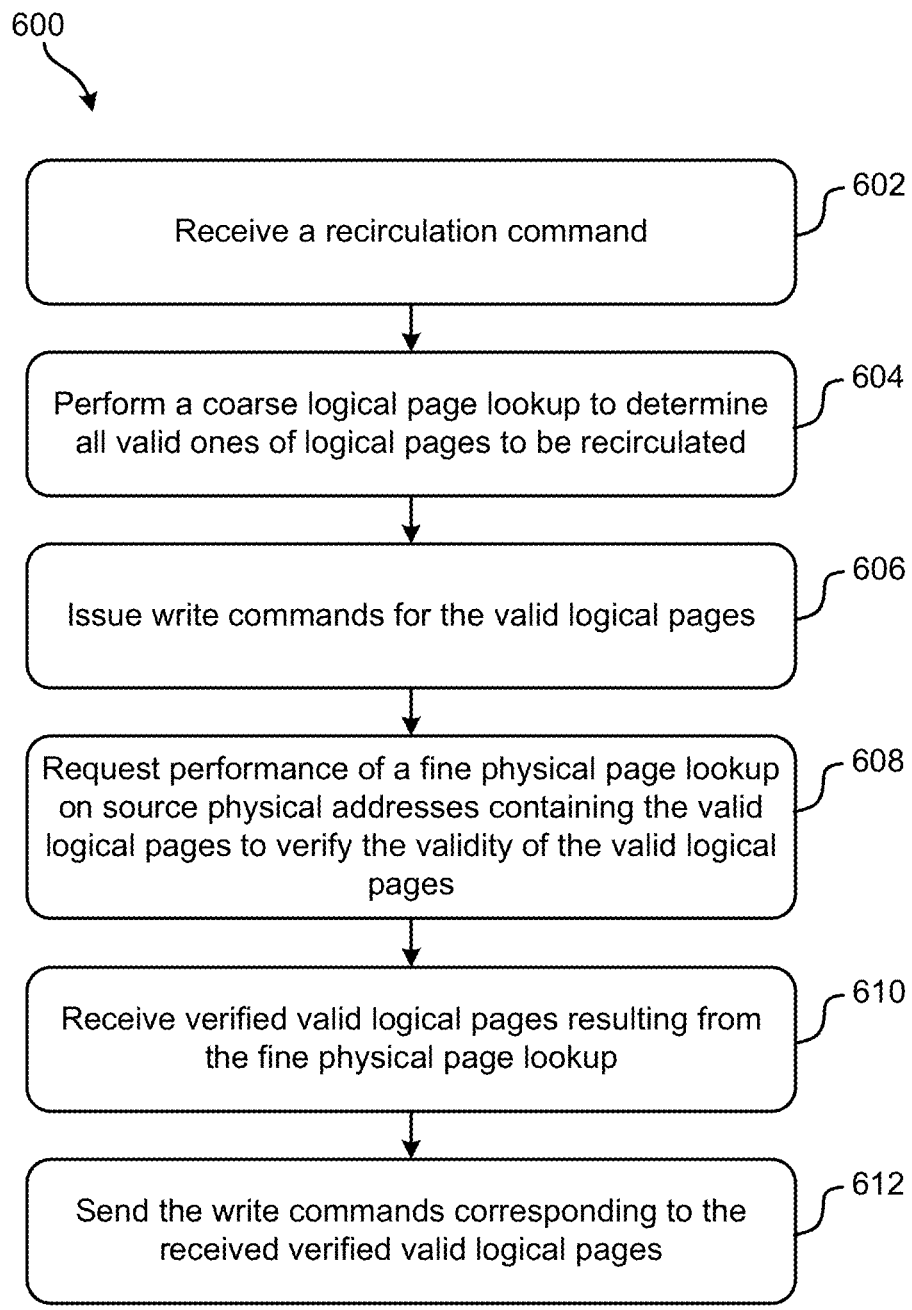
FIG. 6 is a flowchart of a method, in accordance with one embodiment.

Now referring to FIG. 6, a flowchart of a method 600 is shown according to one embodiment. The method 600 may be performed in accordance with the present invention in any of the environments depicted in FIGS. 1-5, among others, in various embodiments. Of course, more or less operations than those specifically described in FIG. 5 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Again, the ability to quickly and effectively determine which logical pages within a block of memory are valid, and which logical pages are dirty, is particularly desired, especially in association with the performance of garbage collection. It follows that any one or more of the operations of method 600 described below may be performed as a part of and/or in supplement to the performance of a garbage collection operation on a given block of memory.

Looking to FIG. 6, method 600 includes operation 602, where a recirculation command is received, e.g., to be performed on a given block of memory. Depending on the approach, the recirculation command may be received from a user, a controller, etc. As mentioned above, data of logical pages may be recirculated by writing the data to a new physical location in memory, marking the logical page at the physical location having the old copy of the data as invalid, and then updating the mapping information. Moreover, it is preferred that recirculation operations are processed on physical pages as a whole. Thus, when processing a chain of recirculation commands, the commands may preferably be processed on a single physical pages basis.

However, dirty and valid logical pages are interleaved within codewords and across physical pages of the given block of memory. Thus, operation 604 includes performing a coarse logical page lookup to determine all valid ones of logical pages to be recirculated. The coarse logical page lookup may be performed using program instructions, e.g., firmware, software, etc., or any other type of program instructions which would be apparent to one skilled in the art upon reading the present description. Moreover, in preferred approaches, the coarse logical page lookup is performed using a page state table (PST). The PST may be used to determine which codewords in the block of memory contain one or more valid logical pages, and distinguish them from codewords having only dirty logical pages, thereby locating all valid logical pages in the block of memory at the codeword level, e.g., using a plurality of bits as will soon become apparent.

The PST includes a bit field for each codeword that tracks which logical pages should be recirculated. Thus, the bit fields allows program instructions (e.g., firmware) to accurately and efficiently inform the hardware select logical pages to be recirculated. Moreover, the bit fields may be used to determine one or more bits reflecting a status of the one or more logical pages contained in each codeword.

Figure 7A:
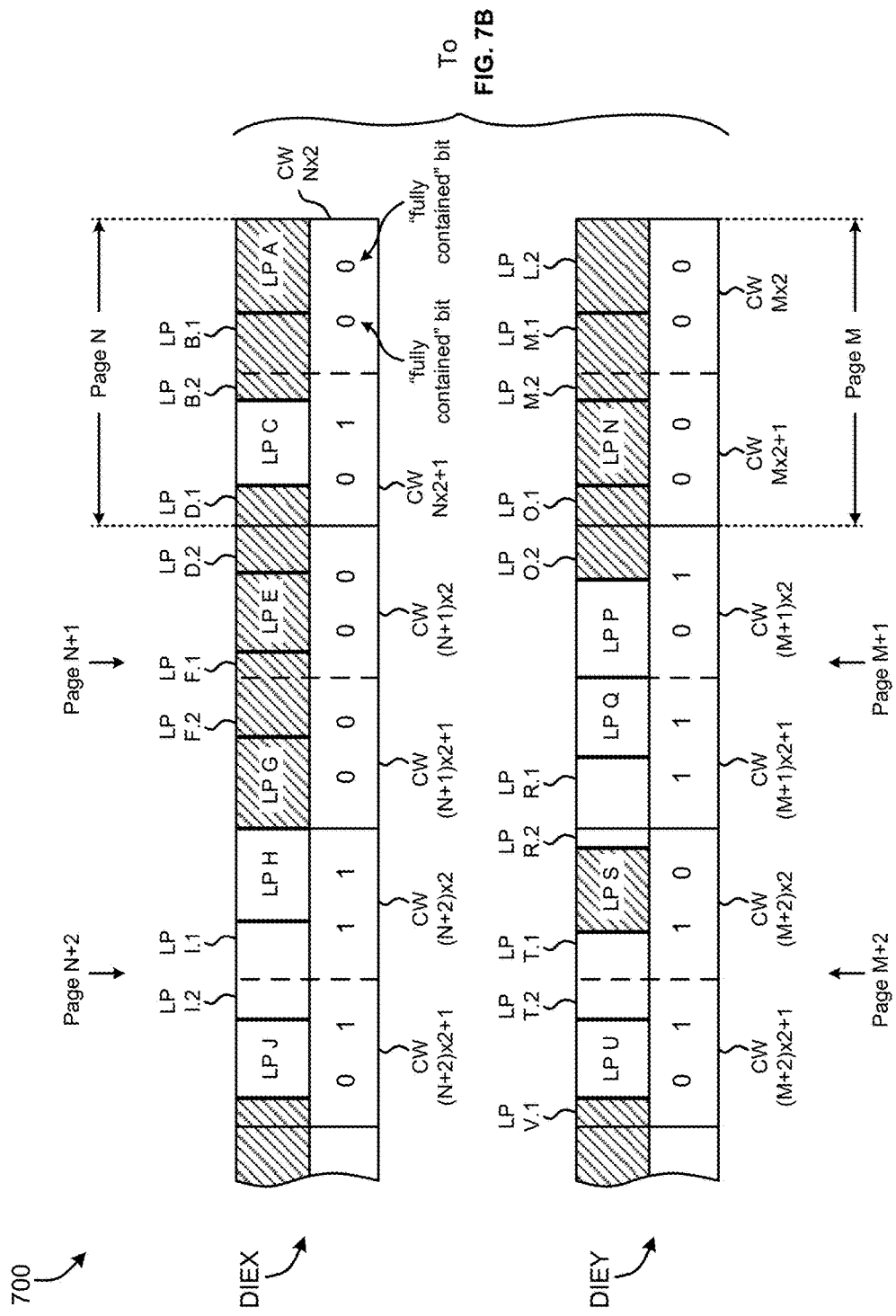
FIG. 7A is a representational diagram of a page state table, in accordance with one embodiment.

According to an exemplary embodiment, which is in no way intended to limit the invention, bit fields having two bits are illustrated in the representative PST 700 of FIG. 7A. Bit fields are illustrated for several physical pages of two dies DIEX and DIEY. Moving from right to left along the codewords of DIEX and DIEY, the first bit (denoted as the "fully contained" bit) of the two bit pair is intended to represent whether the first fully contained logical page of valid data (shown in drawing with no fill) is a valid logical page contained within the corresponding codeword, while the second bit (denoted as the "straddle out" bit) of the pair is intended to represent whether a subsequent logical page of valid data "straddles out" of the physical page. Moreover, a value of 0 for the first bit of the pair indicates that a the first fully contained logical page of the codeword is not a valid logical page (e.g., does not include valid data), while a value of 1 for the first bit of the pair indicates that the first fully contained logical page of the codeword is a valid logical page having valid data. Similarly, a value of 0 for the second bit of the bit pair indicates that a subsequent logical page of valid data does not straddle out of the physical page, while a value of 1 for the second bit of the pair indicates that a logical page of valid data straddles out of the physical page. According to some approaches, a physical codeword offset may be used, e.g., by hardware, to determine the location at which the first fully contained logical page begins in the physical page of memory.

For example, the first fully contained bit of codeword CW (N+2)×2 of Page N+2 has a value of 1 to represent valid logical page LP H which is fully contained within CW (N+2)×2, and the second bit of CW (N+2)×2 has a value of 1 to represent valid logical page LP I.1 which straddles out of CW (N+2)×2 and into CW (N+2)×2+1. However, according to another example, the first fully contained bit of codeword CW (M+2)×2+1 of Page M+2 has a value of 1 to represent valid logical page LP U which is fully contained within CW (M+2)×2+1, and the second bit of CW (M+2)×2+1 has a value of 0 to indicate the subsequent logical page LP V.1 is not a valid logical page, thereby not having valid data.

It should be noted that although the bit field illustrated in the present exemplary embodiment of FIG. 7A shows a bit field having only two bits, the embodiments presented herein are in no way limited thereto. According to other embodiments, the number of bits included in the bit field may vary, e.g., depending on how many logical pages may be stored in a given codeword of the physical pages. Thus, the bit field for each codeword may be scaled to include more bits as would be appreciated by one skilled in the art upon reading the present description.

Moving on to FIG. 7B, a list of recirculation commands 710 have been compiled from the bit fields of FIG. 7A. As mentioned above, bit fields may be used to determine one or more bits reflecting a status of the one or more logical pages contained in each codeword. Specifically, three bits are presented for each codeword which reflect a status of the logical pages contained in the codeword. Accordingly, the three bits may be used to determine all valid ones of logical pages in the various codewords to be recirculated. CW0 of Page N in FIG. 7B corresponds to CW N×2 of FIG. 7A, CW1 of Page N in FIG. 7B corresponds to CW N×2+1 of FIG. 7A, and so on.

Again reading from right to left, the start bit (rightmost bit) indicates whether a valid logical page straddles into the codeword. Although the bit field described in conjunction with FIG. 7A did not specifically indicate whether a valid logical page straddled into a given codeword, this information may be extrapolated from the second bit of the bit field pair as it may be assumed that a valid logical page which straddles out of a given codeword will straddle into the subsequent codeword. As such, looking to the recirculation command associated with physical Page M+2 in FIG. 7B, the first bit of CW 0 (read right to left) is marked with a 1.

CW0 of Page M+2 in FIG. 7B corresponds to CW (M+2)×2 in FIG. 7A. This indicates that valid logical page LP R.2 from FIG. 7A straddles into CW (M+2)×2 which is extrapolated from the second bit of the bit field pair of CW (M+1)×2+1.

With continued reference to FIG. 7B, the middle bit indicates whether a valid logical page is fully contained in the codeword. Moreover, the end bit (leftmost bit) indicates whether a valid logical page straddles to the subsequent codeword. As described above, a bit value of 0 indicates that a valid logical page is not present at the given location, while a bit value of 1 indicates that a valid logical page is present.

As a result of performing the coarse logical page lookup using the plurality of bits described above, the recirculation commands shown in FIG. 7B include all codewords having valid logical pages included therein, while keeping the codewords having only invalidated logical pages out of consideration for recirculation.

Again, it should be noted that although the embodiment illustrated in the present exemplary embodiment of FIG. 7B shows combinations of three bits describing the logical pages in each codeword, this is in no way intended to limit the invention, but rather is presented by way of example only. According to other embodiments, the number of bits included in the recirculation commands may vary, e.g., depending on how many logical pages are stored in a given codeword of the physical pages. Thus, the number of bits included may be scaled to include a different number of bits as would be appreciated by one skilled in the art upon reading the present description.

Referring again to FIG. 6, in response to performing the coarse logical page lookup, operation 606 includes issuing write commands for the valid logical pages. According to some approaches, the write commands may be issued by a logical page processor. Moreover, the write commands may be issued in a first-in-first-out (FIFO) manner, last-in-first-out (LIFO), or any other desired processing order which would be apparent to one skilled in the art upon reading the present description.

Looking now to FIG. 7C, a list of recirculation write commands 720 are developed, e.g., using a non-volatile memory controller in combination with the recirculation commands shown in FIG. 7B. Moreover, once developed, the recirculation write commands may be sent to the logical page processor. As shown in FIG. 7C, the recirculation write commands include the logical block address (LBA) associated with each of the source physical locations (here being represented by physical page number and codeword number). As seen for the list of recirculation commands 710, the list of recirculation write commands 720 are processed in a FIFO manner.

However, as mentioned above, valid and dirty logical pages may be interleaved within codewords as well as across physical pages. Moreover, although the coarse logical page lookup of operation 604 in FIG. 6 may be able to determine the physical codewords in which one or more valid logical pages of a given block are stored, the coarse logical page lookup may not be able to distinguish between valid and dirty logical pages stored within the same physical codeword. For example, both a valid logical page and a dirty logical page may be stored in a given codeword. According to the present example, the coarse logical page lookup of operation 604 would designate both the valid and dirty logical pages in the given codeword as "valid" although only one of the logical pages is truly a valid logical page.

Accordingly, operation 608 includes requesting performance of a fine physical page lookup on source physical addresses containing the valid logical pages to verify the validity of the valid logical pages. Thus, the fine physical page lookup of operation 608 is preferably able to distinguish between valid and dirty logical pages stored in the same codeword. While a valid logical page may be verified as being stored at a physical address to be recirculated (e.g., as part of a garbage collection operation), the logical page may have been previously recirculated (e.g., overwritten) to a new physical address. It follows that one or more of the logical pages determined to be valid in operation 604 may actually be dirty logical pages. Thus, operation 608 is preferably able to verify the validity of each logical page associated with the write commands, and distinguish between valid and dirty logical pages stored in the same codeword.

According to an illustrative approach, the fine physical page lookup may include cross-referencing a source physical address of a valid logical page (designated as being a valid logical page, yet not verified as being a valid logical page) with a current physical address of the valid logical page, e.g., using a LPT. As a result, it may be determined whether the source physical address to which the valid logical page maps, matches the current physical address associated with the valid logical page. The validity of the logical page in question may be verified in response to determining that the source physical address matches (is the same physical address) as the current physical address. However, the validity of the logical page in question may be overturned in response to determining that the source physical address does not match (is a different physical address than) the current physical address, thereby re-designating the logical page in question as a dirty logical page having been previously recirculated (e.g., overwritten).

Figure 7D:
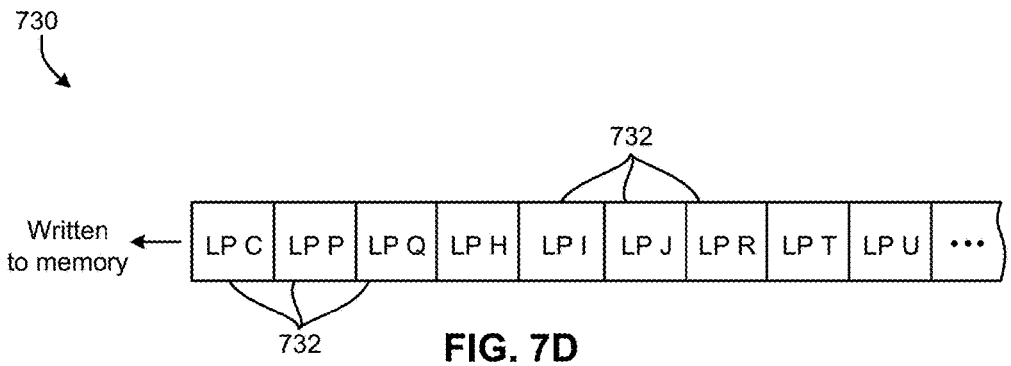
FIG. 7D is a representational diagram of a list of logical block address write commands, in accordance with one embodiment.

Looking to FIG. 7D, a resulting list of LBA write commands 730 are shown after being subject to an LPT lookup. As described above, the LPT lookup includes cross-referencing the source physical address of each valid logical page with a current physical address of each valid logical page. Successful cross-referencing of a write command results in an approved LBA write command being sent for writing to memory. Thus, the resulting LBA write commands for each of the valid logical pages 732 included in list 730 were each successfully cross-referenced. The order of the LBA write commands may maintain the same order as presented in list 720 of FIG. 7C and may therefore be processed in a FIFO manner, but is in no way limited thereto.

Although not shown in FIGS. 7A-7D, should the cross-referencing of any or the write commands be unsuccessful (e.g., the source physical address does not match the current physical address), the write command may be failed and the valid logical page removed from the list of LBA write commands sent for writing. Similarly, it should be noted that a failure in a given codeword will result in a failure of only the logical pages within that codeword.

With continued reference to FIG. 6, method 600, verified valid logical pages are received resulting from the fine physical page lookup. See operation 610. Moreover, operation 612 includes sending the write commands corresponding to the received verified valid logical pages to the appropriate circuitry responsible for writing to memory, whereby data from the valid logical pages is recirculated (e.g., written) to a new physical location in memory. Such circuitry may be of a type noted herein and/or conventional.

It follows that the request for the fine physical page lookup of operation 608 may be sent to hardware, e.g., a controller, an LPT, etc., where the source and current physical addresses are compared. Moreover, the verified valid logical pages may be received from a controller, an LPT, etc., located in hardware.

Exemplary Embodiments

As mentioned above, some embodiments include bit field implementations having two bits. Moreover, the two bit, bit fields may be used to determine three bits for each codeword for a given amount of memory, the three bits reflecting a status of the logical pages contained in the codeword. The following implementations reflect exemplary embodiments of this two bit/three bit combination and are in no way intended to limit the invention, but rather are presented by way of example only. According to other embodiments, the number of bits included in the bit field and/or the number of bits used to reflect a status of the logical pages contained in a codeword may vary, e.g., depending on how many logical pages may be stored in a given codeword of the physical pages. Thus, the number of bits implemented in a given embodiment may be scaled to include more or fewer bits as would be appreciated by one skilled in the art upon reading the present description.

The two bit PST bit field may have the following values corresponding to the given situations:
1) Logical page (LP) fully contained within the physical page (PP)+LP straddling out of the PP=PST value of OX
2) LP straddling into the PP+LP fully contained within the PP=PST value of XX
3) LP straddling into the PP+LP fully contained within the PP+LP straddling out of the PP=PST value of XX
4) LP straddling into the PP+LP straddling out of the PP=PST value of X0

Moreover, the following bit combinations may correspond to the respective instances:
LP 0 represented by a 10 for CW0/page 0 (fully contained)
LP 1 represented by a 01 for CW0/page 0 (straddle)
LP 2 represented by a 10 for CW1/page 0 (fully contained)
LP 3 represented by a 01 for CW1/page 0 (straddle)
LP 4 represented by a 10 for CW0/page 1 (fully contained)
LP 5 represented by a 01 for CW0 age 1 (straddle)
LP 6 represented by a 01 for CW1/page 1 (straddle)

The three bits used to reflect a status of the logical pages contained in the codewords as mentioned above may correspond to the following four scenarios according to an exemplary embodiment:
1) LP fully contained within the PP+LP straddling out of the PP=represented by 110 to denote the absence of a LP straddling into the PP.
2) LP straddling into the PP+LP fully contained within the PP=represented by 011 to denote the absence of a LP straddling out of the PP.
3) LP straddling into the PP+LP fully contained within the PP+LP straddling out of the PP=represented by 111 to denote a LP straddling into the PP as well as a LP straddling out of the PP.
4) LP straddling into the PP+LP straddling out of the PP=represented by 101 to denote a LP straddling into the PP as well as a LP straddling out of the PP without having a LP fully contained in the PP.

It follows that various combinations of the three bits used to reflect a status of the logical pages contained in the codewords may be used to determine how many valid logical pages are to be recirculated in one or more codewords. The different scenarios corresponding to the different number of valid logical pages to be recirculated may be defined as follows:
1) 000 (no valid LPs)-start-end (010)—1 valid logical page
2) start-end (010)-000 (no valid LPs)—1 valid logical page
3a) end (011)-110 (start)—3 valid logical pages processed
3b) end (011)-100 (start)—2 valid logical pages processed
3c) end (001)-100 (start)—1 valid logical page processed
3d) end (001)-110 (start)—2 valid logical pages processed
4a) start (110)-000 (no valid LPs)—1 valid LP+remainder
4b) start (100)-000 (no valid LPs)—remainder only
5a) 000 (no valid LPs)-011 (end)—1 valid LP+remainder
5b) 000 (no valid LPs)-001 (end)—remainder only
6a) 111 (continuous)-111 (continuous)—4 valid logical pages+remainder
6b) 111 (continuous)-101 (continuous)—3 valid logical pages+remainder
6c) 101 (continuous)-111 (continuous)—3 valid logical pages+remainder
6d) 101 (continuous)-101 (continuous)—2 valid logical pages+remainder
7a) 011 (end)-111 (continuous)—4 valid logical pages
7b) 001 (end)-111 (continuous)—3 valid logical pages
7c) 011 (end)-101 (continuous)—3 valid logical pages
7d) 001 (end)-101 (continuous)—2 valid logical pages
8a) 111 (continuous)-110 (start)—3 valid logical pages+remainder
8b) 111 (continuous)-100 (start)—2 valid logical pages+remainder
8a) 101 (continuous)-110 (start)—2 valid logical pages+remainder
8b) 101 (continuous)-100 (start)—1 valid logical page+remainder A more detailed breakdown of the possible valid codeword combinations may be developed depending on the number of logical pages which are processed as follows:
For embodiments in which 0 logical pages are processed:
1) 100 (end)-000 (no valid LPs)
For embodiments in which 1 logical page is processed:
2) 000 (no valid LPs)-001 (cont.)
3) 100 (end)-001 (cont.)
4) 000 (no valid LPs)-010 (start)
5) 100 (end)-010 (start)
6) 001 (cont.)-100 (start)
7) 101 (cont.)-100 (start)
8) 010 (start)-000 (no valid LPs)
9) 110 (start)-000 (no valid LPs)
For embodiments in which 2 logical pages are processed:
10) 010 (cont.)-001 (cont.)
11) 110 (cont.)-001 (cont.)
12) 010 (cont.)-010 (start)
13) 110 (end)-010 (start)
14) 011 (cont.)-100 (start)
15) 000 (no valid LPs)-011 (cont.)
16) 100 (end)-011 (cont.)
17) 001 (cont.)-101 (cont.)
18) 101 (cont.)-101 (cont.)
19) 111 (cont.)-100 (start)
20) 101 (end)-110 (start)
21) 001 (cont.)-110 (start)
For embodiments in which 3 logical pages are processed:
22) 010 (cont.)-011 (cont.)
23) 110 (cont.)-011 (cont.)
24) 111 (cont.)-110 (start)

25) 011 (cont.)-110 (start)
26) 011 (cont.)-101 (start)
27) 111 (cont.)-101 (cont.)
28) 101 (cont.)-111 (cont.)
29) 001 (cont.)-111 (cont.)

For embodiments in which 4 logical pages are processed:

30) 011 (cont.)-111 (cont.)
31) 111 (cont.)-111 (cont.)

Any remainder of a valid logical page (a portion of the valid logical page which straddles out of the physical page) may be stored in memory until being fetched back when the remainder of the valid logical page is written (straddled into) the subsequent physical page. The remainder of the valid logical page may be fetched back when the write command (straddle in command) is received by a controller, a processor, etc.

As previously described, straddle out remainders may be matched to the straddle in commands of subsequent physical pages using the flash physical address. When the remainder of the valid logical page is fetched back from memory, hardware may calculate an offset address to which the remainder may be written to. The offset address may be calculated by adding a displacement size to the offset of the straddle in command as would be appreciated by one skilled in the art upon reading the present description. In other words, the difference between the codeword size and the logical page size results in the starting (offset) address of the remainder of the valid logical page (Codeword size−logical page size=starting address).

The hardware is preferably able to distinguish several cases by providing additional hardware processing capabilities in order to provide a desired level of logical page processing accuracy. This ability to distinguish several cases may result from the hardware implementing the offset address. According to some approaches, the hardware may be able to skip over certain logical pages within a codeword, e.g., depending on the bit setting associated therewith.

For example an End, Middle and Start (EMS) valid bit setting of 101b may correspond to a full valid codeword having two remainders, or similarly, the bit setting may correspond to the case where a codeword has a straddle in, fully contained LP and a straddle out where the firmware instructs the hardware to skip the fully contained LP. To facilitate the various combinations, the offset address may be used to distinguish between the different cases. Any offset between the offset address and the start of the first fully contained LP greater than a threshold (e.g., about zero) implies that the codeword associated therewith includes a remainder-remainder combination.

Furthermore, as mentioned above, the hardware may also be able to skip logical pages depending on which valid bits are set. The ability to skip logical pages translates to more efficient processing and reduced latency.

Hardware may determine whether to skip one logical page, two logical pages and/or three logical pages based on the valid bits. According to one embodiment, hardware may determine to skip one logical page when the valid LPs and offset address into the codewords are as follows:

1) 010_010—no straddle page in and no straddle page out-no straddle across codewords (CWs)
2) 110_010—no straddle page in-no straddle across CWs
3) 100_010 && offset address+logical page−CWs>CWs-LPs
4) 101_100 && offset address≤CWs-LPs
5) 111_101 && offset address≤CWs-LPs
6) 101_101 && offset address≤CWs-LPs
7) 011_101 && offset address≤CWs-LPs
8) 001_101 && offset address≤CWs-LPs
9) 110_001 && offset address≥CWs-LPs
10) 010_001 && offset address≥CWs-LPs According to another embodiment, hardware may determine to skip two logical pages when the valid LPs and offset address into the codewords are as follows:

1) 100_010 && offset address+logical page−CWs>CWs-LPs
2) 010_001 && offset address<CWs-LPs
3) 110_001 && offset address<CWs-LPs
4) 100_001 && offset address≥CWs-LPs According to yet another embodiment, hardware may determine to skip three logical pages when the valid LPs and offset address into the codewords are as follows:

1) 100_001 && offset address<CWs-LPs

Furthermore, error processing may be implemented according to some embodiments. According to some embodiments, error processing may include three scenarios as follows:

1) Error on both codewords: Since the physical codeword offset values may not be available for use, the valid bits may be relied on in order to determine how many logical pages should be sent to achieve the correct amount of error status (e.g., preferably one per logical page). Any straddle out instances in either of the codewords may also be marked as invalid such that additional recirculation commands which match the first logical page will be treated as having an error and an error status is preferably sent.

2) Error on codeword 0 only: If the command is associated with a two codeword operation, the codeword 1 offset may be decremented by the logical page size. The valid bits may be used to determine how many logical pages are contained within codeword 0 as an accurate offset address is desired to determine the correct amount of logical pages. Moreover, the following calculations may be implemented:
   A. 100=CWs−(LPs−offset codeword 1) to obtain the codeword 0 offset=CWs-LPs+offset codeword 1
   B. X10=CWs-2LPs+offset codeword 1
   C. XX1=this is the offset of the remainder into codeword 0. It may correspond to two logical pages, or three logical pages, e.g., depending on the offset codeword 1 value which will dictate between the two. Moreover, depending on the number of logical pages, the following program instructions may be implemented as desired:

```
If offset codeword 1 ≥ 2LPs − CWs then
    CWs−2LPs + offset codeword 1 + CWs−LPs
Else
    2(CWs−LPs) + offset codeword 1
End
```

3) Error on codeword 1 only: After processing all valid logical pages fully contained in codeword 0, the correct number of error status may be returned, e.g., based on the offset into codeword 1 and the valid bits associated therewith. The offset codeword 1 is accurate as it is based on the offset from codeword 0.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 8:
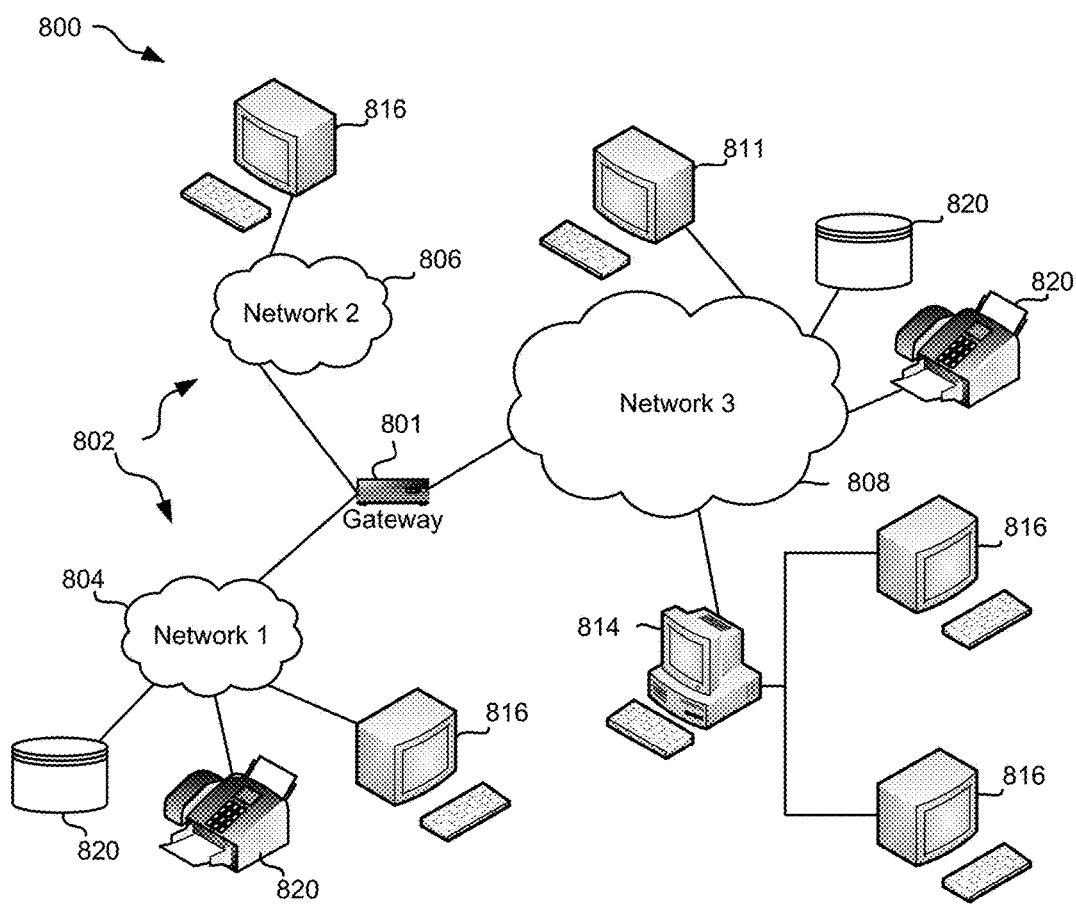
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
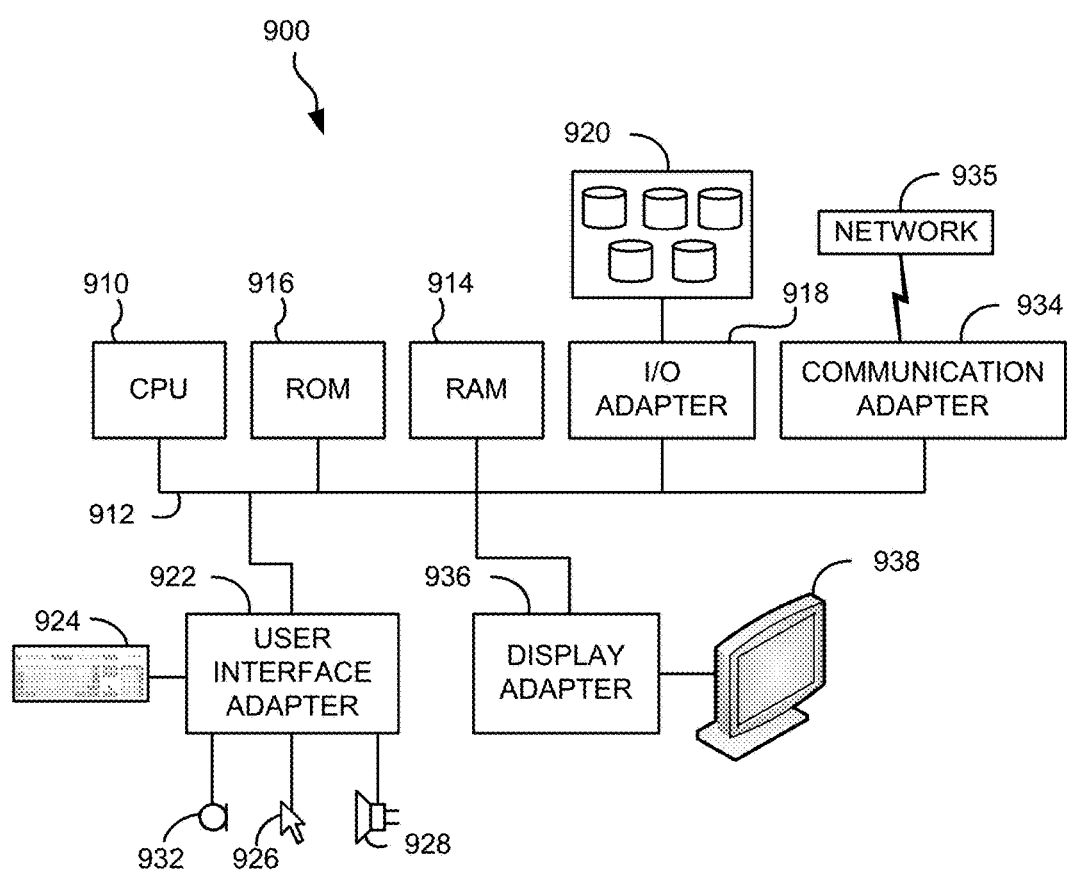
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
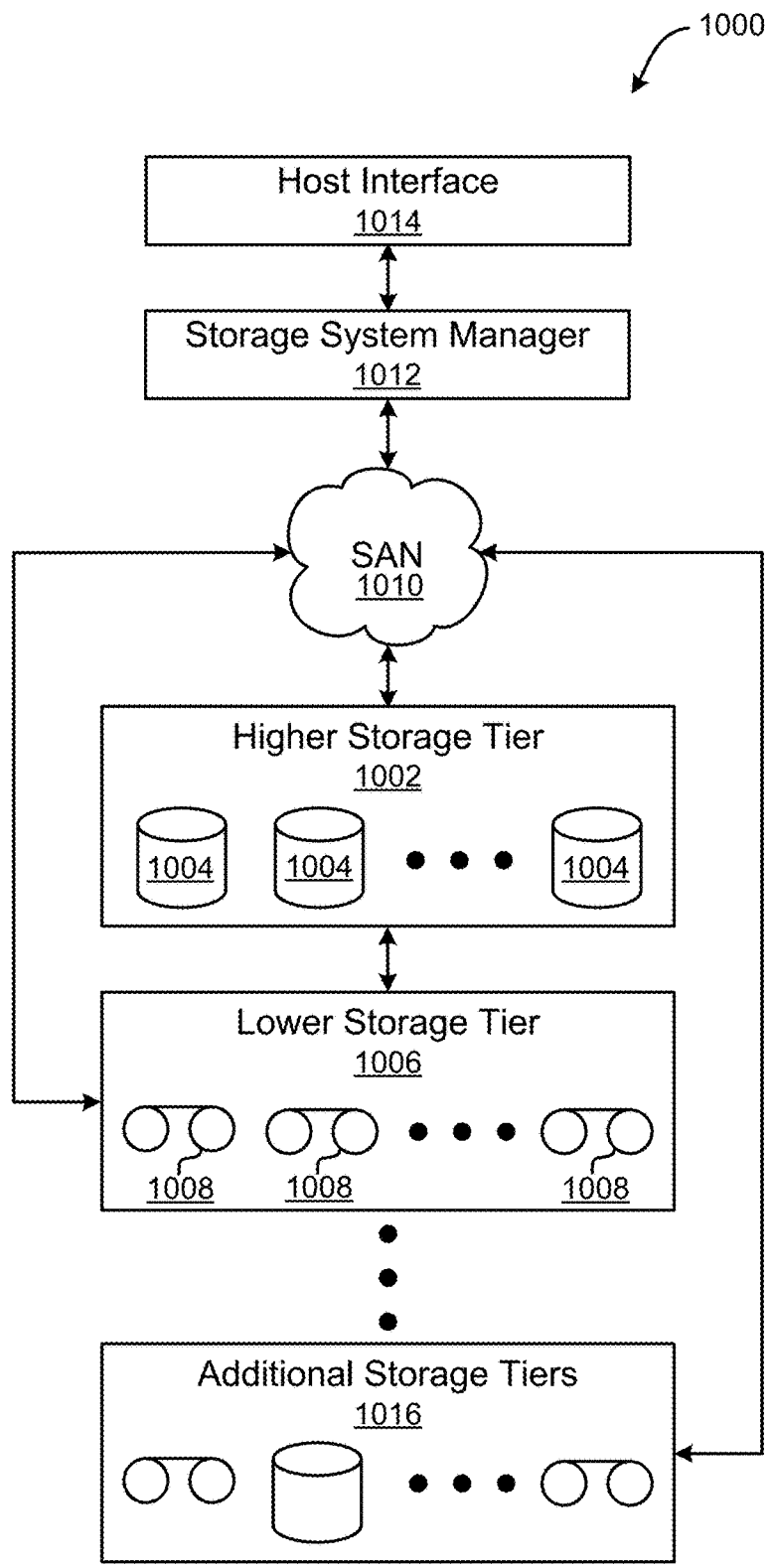
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

What is claimed is:

1. A method, comprising:
   receiving a recirculation command at a solid state drive;
   performing a coarse page lookup to determine valid ones of logical pages to be recirculated;
   issuing write commands for the valid logical pages;
   requesting performance of a fine page lookup on source physical addresses containing the valid logical pages to verify the valid logical pages;
   receiving verified valid logical pages resulting from the fine page lookup; and
   sending the write commands corresponding to the verified valid logical pages.

2. The method of claim 1, wherein the coarse page lookup is performed using a page state table.

3. The method of claim 2, wherein the page state table includes a bit field for each codeword containing one or more of the logical pages.

4. The method of claim 3, wherein each of the bit fields are used to determine one or more bits reflecting a status of the one or more logical pages contained in each codeword.

5. The method of claim 1, wherein the fine page lookup includes cross-referencing a source physical address of the verified valid logical pages with a current physical address of the verified valid logical pages using a logical to physical table.

6. The method of claim 1, wherein the coarse page lookup is performed using program instructions.

7. The method of claim 1, wherein the request for a fine page lookup is sent to hardware, wherein the verified valid logical pages are received from a controller in hardware.

8. The method of claim 1, wherein the write commands are issued in a first-in-first-out manner.

9. A system, comprising:
   a plurality of non-volatile random access memory blocks configured to store data; and
   a processor and logic integrated with and/or executable by the processor, the logic being configured to:
   receive a recirculation command;
   perform a coarse page lookup to determine valid ones of logical pages to be recirculated;
   issue write commands for the valid logical pages;
   request performance of a fine page lookup on physical pages of each block containing the valid logical pages to verify the write commands;
   receive verified write commands resulting from the fine page lookup; and
   send the verified write commands.

10. The system of claim 9, wherein the coarse page lookup is performed using a page state table.

11. The system of claim 10, wherein the page state table maintains a bit field for each codeword containing one or more of the logical pages.

12. The system of claim 11, wherein each of the bit fields are used to determine one or more bits reflecting a status of the one or more logical pages contained in each codeword.

13. A computer program product comprising a computer readable storage medium having program instructions embodied therewith, the program instructions readable and/or executable by a controller to cause the controller to:
- receive, by the controller, a recirculation command;
- perform, by the controller, a coarse page lookup to determine valid ones of logical pages to be recirculated;
- issue, by the controller, write commands for the valid logical pages;
- request, by the controller, performance of a fine page lookup on physical pages of each block containing the valid logical pages to verify the write commands;
- receive, by the controller, verified write commands resulting from the fine page lookup; and
- send, by the controller, the verified write commands.

14. The computer program product of claim 13, wherein the coarse page lookup is performed using a page state table.

15. The computer program product of claim 14, wherein the page state table maintains a bit field for each codeword containing one or more of the logical pages.

16. The computer program product of claim 15, wherein each of the bit fields are used to determine one or more bits reflecting a status of the one or more logical pages contained in each codeword.

17. The computer program product of claim 13, wherein the fine page lookup is performed using a logical to physical table.

18. The computer program product of claim 13, wherein the coarse page lookup is performed using program instructions.

19. The computer program product of claim 13, wherein the request for a fine page lookup is sent to hardware.

20. The computer program product of claim 13, wherein the write commands are issued in a first-in-first-out manner.

* * * * *